United States Patent [19]

Henri

[11] Patent Number: 4,705,317
[45] Date of Patent: Nov. 10, 1987

[54] CONTAINER FOR TRUCK PLATFORM

[76] Inventor: Denis R. Henri, R.R. #1, Box 100, Hammond, Ontario, Canada, K0A 2A0

[21] Appl. No.: 867,636

[22] Filed: May 27, 1986

Related U.S. Application Data

[63] Continuation of Ser. No. 591,983, Mar. 19, 1984, abandoned.

[30] Foreign Application Priority Data

Jun. 3, 1983 [CA] Canada ............................. 429,617

[51] Int. Cl.⁴ ............................................. B60R 5/00
[52] U.S. Cl. ............................. 296/37.6; 224/42.32; 224/42.42
[58] Field of Search ............... 296/10, 24 R, 37.1, 296/37.6; 280/769; 224/42.32, 42.33, 42.42; 220/77, 334

[56] References Cited

U.S. PATENT DOCUMENTS

| | | | |
|---|---|---|---|
| 1,844,727 | 2/1932 | Van Vorst | 296/24 R |
| 2,722,352 | 11/1955 | Dehnel | 296/37.6 |
| 2,978,153 | 4/1961 | Brindle | 296/37.6 |
| 3,214,807 | 11/1965 | Hinden | 220/77 X |
| 3,326,595 | 6/1967 | Ogilvie | 296/37.6 |
| 3,664,704 | 5/1972 | Ellis | 296/24 R |
| 3,727,971 | 4/1973 | Sisler | 296/37.6 |
| 4,288,011 | 9/1981 | Grossman | 296/37.6 |
| 4,302,044 | 11/1981 | Sims | 296/100 X |
| 4,451,075 | 5/1984 | Canfield | 296/37.6 |
| 4,546,590 | 10/1985 | Finch et al. | 52/588 X |

FOREIGN PATENT DOCUMENTS 551973  1/1958  Canada ........................ 296/24 R Primary Examiner—Robert B. Reeves
Assistant Examiner—Russell D. Stormer
Attorney, Agent, or Firm—Lowe Price LeBlanc Becker & Shur

[57] ABSTRACT

A container for mounting on the platform of a truck comprises a horizontally elongate first wall extending longitudinally of the truck platform and a second wall forming a rear wall of the container and extending at right angles from one end of the first wall to a wall of the truck platform. An elongate container top or lid forming a cover for the container is pivotally secured along one longitudinal edge thereof to the truck wall and slopes downwardly from the truck wall to beyond the first wall, where a marginal, downwardly extending edge portion of the container top forms a fingergrip to facilitate raising of the top.

17 Claims, 7 Drawing Figures

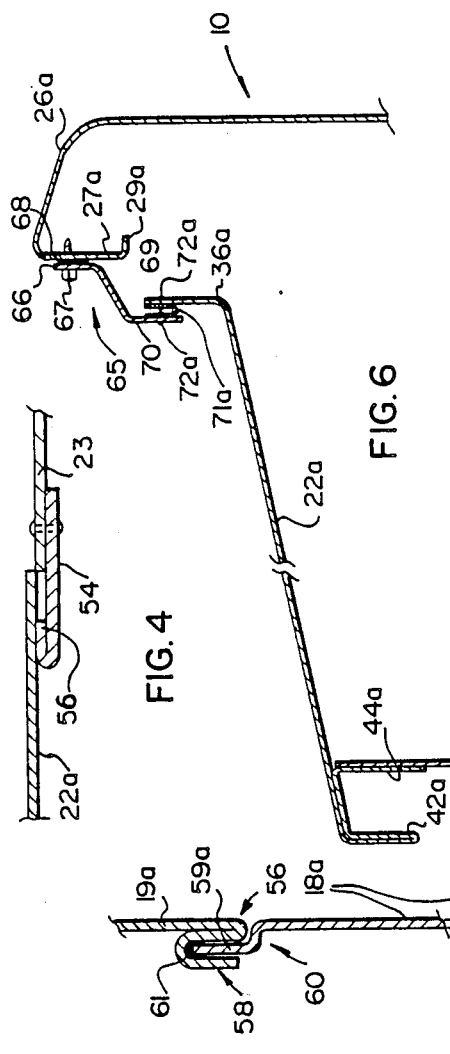
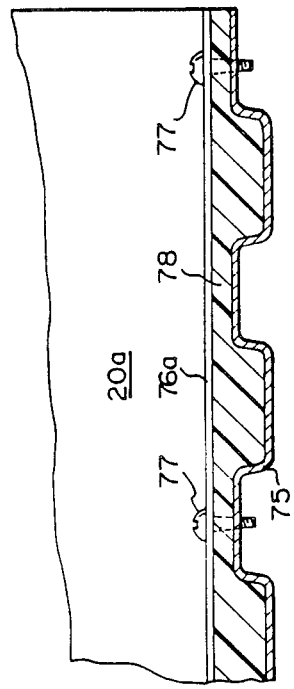
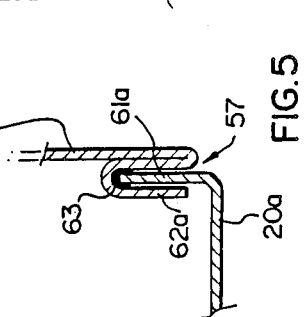

CONTAINER FOR TRUCK PLATFORM

This application is a continuation of application Ser. No. 591,983, filed Mar. 19, 1984, now abandoned.

FIELD OF THE INVENTION

The present invention relates to a container for mounting in a truck and is particularly useful, for example, as a box for containing tools and other objects in an open truck.

BACKGROUND OF THE INVENTION

At the present time, various containers are already available for mounting on the platform of an open truck to serve as tool boxes and the like. One such prior art container is designed to extend across the entire width of the truck platform and has a roof-shaped top with a ridge extending longitudinally of the truck platform, along the centre of the truck, and a pair of pivotal lids or covers sloping downwardly from the ridge towards opposite sides of the truck and being hinged at or adjacent the ridge to provide access to the interior of the container over the side walls of the truck.

This prior container has the disadvantage that, since it extends across the truck, it obstructs the entire width of the truck platform so that persons or objects cannot be accommodated on the truck platform at the portion of the length of the platform occupied by the container.

OBJECT AND SUMMARY OF THE INVENTION

It is, therefore, an object of the present invention to provide a novel and improved container for mounting on a truck platform which occupies only a portion of the area of the truck platform adjacent one of the truck walls or the rear wall of a truck cab.

According to the invention, there is provided a container for mounting in a truck which comprises a horizontally elongate first wall for extending parallel to a wall of the truck platform, a second wall forming a rear wall of the container and extending at right angles from one end of the first wall; an elongate container tip forming a cover for the container; and means for securing the container to the wall of the truck and to a floor of the truck platform; the securing means including hinge means for pivotally securing one longitudinal edge of the container top to the truck wall.

The truck platform wall may be the side wall of the truck or the rear wall of a truck cab and, thus, various container arrangements on the truck platform are possible. For example, a pair of the containers may be provided extending longitudinally of the truck platform along opposite side walls of the truck, in which case a third one of the containers may also be provided extending transversely of the truck platform at the rear of the cab rear wall. Even with as many as three of the containers arranged in this manner, a major portion of the area of the truck platform can be left unobstructed for the carrying of persons and other loads.

In a preferred embodiment of the invention, the container top slopes downwardly from the truck wall over the first wall, and a rain drip strip overlying the hinge means is sealed to the truck wall, so that rain is prevented from entering the interior of the container.

In this embodiment, the container top projects somewhat beyond the first wall and is formed with a downwardly extending marginal edge portion, which is spaced inwardly of the truck platform from the first wall so as to serve both as a rain drip to prevent the entry of rain into the container interior and also to serve as a fingergrip to facilitate raising of the container top, by pivotation of the container top about the hinge means, to provide access to the interior of the container. This downwardly extending marginal edge portion of the container top also serves as a reinforcement flange for strengthening the container top.

Preferably, the flange is one of a pair of parallel, laterally spaced flanges depending from the container top at the marginal longitudinal edge portion of the container top, with both of the flanges being located inwardly of the first wall and with one of the flanges abutting a longitudinal upper marginal edge portion of the first wall wherein the container top is in a closed position.

Preferably, the second wall is secured to the first wall by releasably interengageable portions of the first and second walls, so that when the container is in an unassembled condition the first and second walls can be packaged in a parallel, almost flat arrangement to facilitate transportation and storage of the container.

BRIEF DESCRIPTION OF THE DRAWINGS

The invention will be more readily understood from the following description of preferred embodiments thereof given, by way of example, with reference to the accompanying drawings, in which:

FIG. 4 shows a broken-away view, taken in longitudinal cross-section, through the adjacent ends of the container top portions of FIG. 3;

FIG. 5 shows a broken-away view in horizontal cross-section through two of the vertical walls of one of the containers of FIG. 1;

FIG. 6 shows a broken-away view in transverse cross-section through portions of a container according to a second embodiment of the invention; and FIG. 7 shows a broken-away view of a bottom seal arrangement for use with the containers of FIGS. 1 to 6.

DESCRIPTION OF THE PREFERRED EMBODIMENT

Figure 1:
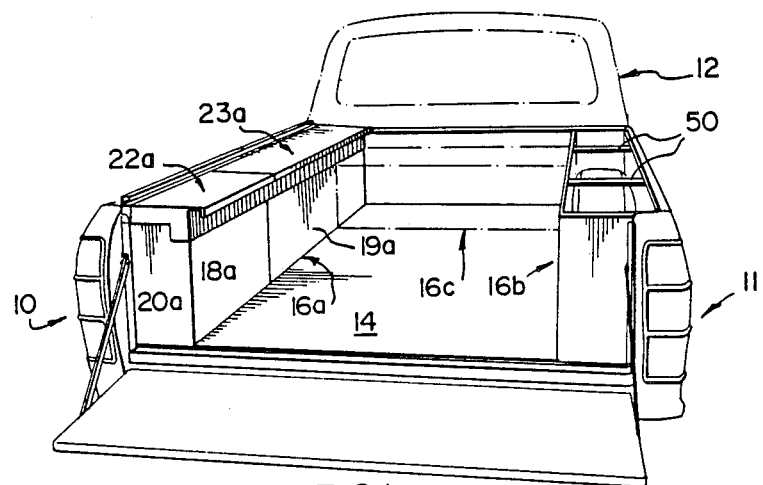
FIG. 1 shows a rear view, in perspective, of parts of a truck provided with containers embodying the present invention.

Referring firstly to FIG. 1, there is illustrated a pair of side walls 10 and 11 of a truck, the cab of which is shown in dash-dot lines and indicated generally by reference numeral 12.

Adjacent the truck side walls 10 and 11, and mounted on a platform 14 of the truck, there are provided a pair of containers indicated generally by reference numerals 16a and 16b.

The containers 16a and 16b extend the entire length of the truck platform 14 along opposite sides of the truck and are secured to the truck walls 10 and 11, respectively.

Reference numeral 16c indicates generally a third container, shown in dash-dot lines, extending transversely of the truck platform 14 between the containers 16a and 16b at the forward end of the truck platform, i.e. adjacent the rear wall of the truck cab 12.

Although three containers 16a, 16b and 16c are illustrated, by way of example, in FIG. 1, it will be appreciated that only one of these three containers may be provided, which may be one of the longitudinally extending containers 16 and 16b or the transverse container 16c, or that alternatively the transverse container 16c may be omitted, and the longitudinal containers 16a and 16b may be provided along the truck walls 10 and 11 as shown in full lines in FIG. 1.

As will be readily apparent from FIG. 1, whichever of these alternative possibilities is adopted, a major portion of the area of the truck platform 14 will remain unobstructed by the container or containers and will thus be available for the carriage of a load.

The container 16a has a vertical elongate longitudinal front wall which is formed of two separate wall portions 18a and 19a and which extends parallel to and at a spacing from the truck side wall 10, and an end wall 20a extending at right angles to the wall portion 18a, from the rear vertical edge of the wall portion 18a to the rear end of the truck side wall 10, to which it is secured by screws (not shown).

A container top or lid, formed of two elongate lid portions 22a and 23a, which are arranged in mutually overlapping end-to-end relationship as described in greater detail below, extends from the truck side wall 10 over the vertical walls 18a, 19a and 20a.

Figure 2:
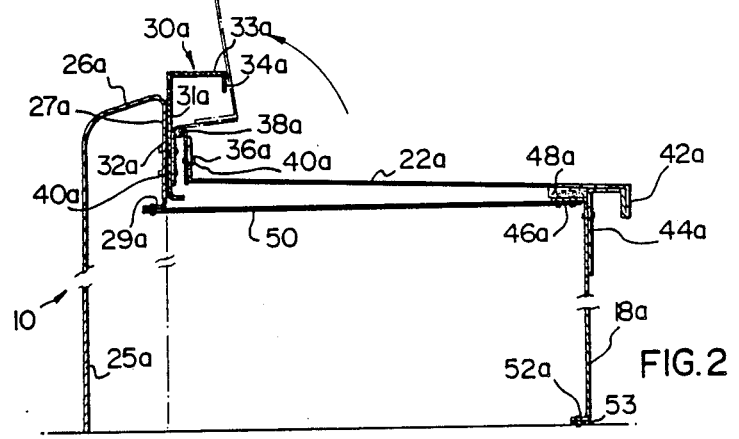
FIG. 2 shows a broken-away view taken in transverse section through one of the side walls of the truck of FIG. 1 and an adjacent container.

As shown in FIG. 2, which shows a broken-away view in cross-section through the container at the wall portion 18a, the truck side wall 10, which is of conventional construction, comprises a vertical wall portion 25a, an upwardly and inwardly sloping top portion 26a and an inner, downwardly extending vertical portion 27a depending from the top portion 26a and formed, at its lower marginal portion, which an inturned flange 29a.

A hinge cover in the form of a rain drip strip indicated generally by reference numeral 30a and extending the entire length of the container 16a has a vertical portion 31a secured to the truck side wall inner portion 27a, with a sealing strip 32a sandwiched therebetween, and a horizontal top 33a projecting inwardly from the vertical portion 31a to a downturned vertical rain drip flange 34a.

The container lid portion 22a slopes downwardly away from the truck side wall 10 to beyond the wall portion 18a and is formed, along its outer longitudinal marginal edge portion, with a vertical flange 36a.

A hinge 38a is secured by rivets or screws 40a to the flange 36a and the truck wall inner portion 27a and, thus, serves as a pivotal connection between the lid portion 22a and the truck side wall 10.

At its inner longitudinal marginal edge portion, i.e. at the right as viewed in FIG. 2, the lid portion 22a, like the lid portion 23a, is bent double to form a depending inner flange 42a and a depending outer flange 44a which acts as a reinforcement flange to strengthen the lid portion 22a.

When the lid is in the closed position in which it is shown in FIGS. 1 and 2, the flange 44a abuts the outer surface of an upper longitudinal marginal edge portion of the wall portion 18a and the flange 42a is spaced inwardly, i.e. to the right as viewed in FIG. 2, of the wall portion 18a in order to form a rain drip and also to provide a convenient fingergrip to facilitate raising of the lid portion 22a from its closed position to an open position, shown in broken lines in FIG. 2, by pivotation of the lid portion 22a about the axis of pivotation of the hinge 38a.

The upper longitudinal marginal edge portion of the wall portion 18a is bent outwardly relative to the platform 14, i.e. inwardly relative to the container 16a, to form a horizontal flange 46a, and a foam seal strip 48a, secured by adhesive to the underside of the lid portion 22a, is compressed between the latter and the flange 46a when the lid is in its closed position to provide a seal between the lid 22a and the wall 18a.

A plurality of metal strips, one of which is indicated by reference numeral 50 in FIG. 2, are secured by screws to the flanges 29a and 46a to retain the top of the wall portion 18a in position.

The bottom of the wall portion 18a is formed with a flange 52a, projecting inwardly of the container 16a, which is secured by screws to the platform 14 with a seal strip 53 of resilient material compressed between the flange 52a and the platform 14.

Figure 3:
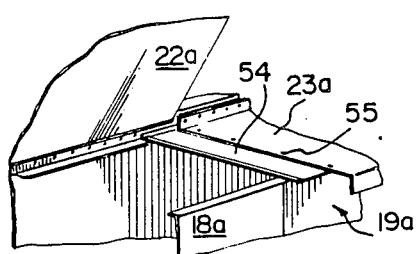
FIG. 3 shows a broken-away view, in perspective, of adjacent ends of two separate portions of the top of one of the containers of FIG. 1.

FIGS. 3 and 4 illustrate the overlapping ends of the lid portions 22a and 23a.

As is apparent from these two Figures, the lid portion 23a is provided with an extension plate 54, which is secured by rivets 55 to the underside of the lid portion 23a at its edge opposite from the lid portion 23a. At its opposite edge, the plate 54 is folded over to form a raised edge portion 56, which prevents rain water reaching the plate 54 between the lid portions 22a and 23a from dripping over the plate 54 into the interior of the container 16a.

FIG. 5 shows a first joint, indicated generally by reference numeral 56, which is provided between the wall portions 18a and 19a and a second joint, indicated generally by reference numeral 57, which is provided between the wall portion 18a and the end wall 20a.

Referring firstly to the joint 56, it will be seen that the wall portion 19a is bent, along a vertical end marginal portion thereof, to form a vertical channel, indicated generally by reference numeral 58, of inverted U cross-section. The adjacent, rear, vertical end marginal edge portion of the wall portion 18a is indicated by reference numeral 59a and is formed with an offset, indicated generally by reference numeral 60, so that the marginal edge portion 59a is spaced inwardly of the container 16a from the plane of the remainder of the wall portion 18a and, thus, the latter lies substantially flush with the wall portion 19a.

The marginal edge portion 59a is received in the channel-shaped portion 58 and is embedded in a caulking compound 61, which is provided in the channel-shaped portion 58.

The end wall 20a is formed, at its inward vertical marginal edge portion, with a flange 61a, which is received in a channel-shaped portion 62a formed at the adjacent, rear, vertical end edge portion of the wall portion 18a. *The flange 61a is embedded in a caulking compound 63 provided in the channel-shaped portion 62a.*

By the provision of these joints 56 and 57 between the end wall 20a and the wall portions 18a and 19a, the latter can be readily connected together in a watertight manner when the container 16a is assembled and mounted in the truck. Prior to that, the joints 56 and 57 are disengaged, so that the end wall 20a and the wall portions 18a and 19a can be nested in one another in mutually parallel relationship and packed in a substantially flat condition for storage and transportation. Prior to the securement of the hinge 38a to the truck side wall 10, the lid portions 22a and 23a can be packed in a similar manner.

FIG. 6 shows a modification of the above-described container 16a and, accordingly, the same reference numerals have been employed in FIG. 6 as in FIGS. 1 to 5 to indicate like components, in order to facilitate the description.

As can be seen from FIG. 6, a rain drip strip indicated generally by reference numeral 65 replaces the rain drip strip 30a of FIG. 2. The strip 65 has a vertical upper portion 66, which is secured to the truck side wall vertical inner portion 27a by a screw 67, an intermediate portion 69 sloping downwardly and inwardly of the truck wall 10 from the inner wall portion 27a, and a lowermost, vertical portion 70 depending from the sloping intermediate portion 69.

A caulking strip 68 is sandwiched and compressed between the truck wall inner portion 27a and the rain strip upper portion 66 by the tightening of the screws 67, which is one of a plurality of such screws employed for that purpose and which is a nylon headed screw in order to resist the corrosion effect of atmospheric moisture.

The hinge 38a of FIG. 2 is replaced by an inverted hinge 71a secured by rivets 72a to the lid vertical portion 36a and the rain strip lowermost portion 70.

As will be readily apparent, various other modifications may be made in the formation of the rain drip strip. For example, the rain drip strip could be extended upwardly, to overlie to upwardly sloping portion 26a of the truck side wall 10, and the top portion 33a of the rain drip strip 30a shown in FIG. 2 could be sloped downwardly and inwardly, relative to the truck.

The truck platform 14 is illustrated in FIG. 1 as being flat, to facilitate the illustration. However, truck platforms are generally formed with a floor of longitudinally channeled shape, as illustrated in FIG. 7, which shows a broken-away fragmentary portion of a longitudinally channeled truck platform floor indicated by reference numeral 75.

FIG. 7 also illustrates a broken-away portion of the end wall 20a, which is formed along its bottom edge with a right angled flange 76a through which are inserted screws 77, which extend into threaded engagement with the truck platform floor 75 for securing the rear wall 20a to the floor 75.

Between the flange 76a and the floor 75, there is interposed a sealing strip 78 of resilient material, which is shaped to conform to the channel shape of the floor 75 in order to prevent the ingress of water into the container 16a between the rear wall 20a and the floor 75.

Various other modifications may be made in the abovedescribed container. For example, the lid portions 22a and 23a can each be provided with a catch for releasably securing them to the wall portions 18a and 19a, respectively, or with a hasp or the like to enable a padlock to be employed for that purpose.

Also, the containers 16a and 16b need not extend the entire length of the platform 14 but may, for example, extend forwardly from the rear of the platform to a position at the rear of the rear wheel well of the truck or forwardly from a position in front of the rear wheel well to the cab 12, and in the former case may be provided with a front wall corresponding to the rear wall 20a. Likewise, the container 16c may extend the full width of the platform 14.

With reference to FIG. 7, caulking may be provided between the sealing strip 78 and the floor 75 and/or the flange 76a.

A lower portion of the flange 42 may be bent at an inclination downwardly and outwardly relative to the wall portions 18a and 19a to improve the appearance of the container.

A further possibility is to provide within the container a removable tray, similar to the trays commonly provided in tool boxes, supported on ledges provided for example by L-shaped channel members secured within the container to the walls of the container and the truck platform.

Accordingly, it is to be understood that the invention is not restricted to the features of the above-described embodiments thereof but may be varied within the spirit and scope of the appended claims.

I claim:

1. A container assembly for installation within a pickup truck, said truck including a platform and a truck wall extending upwardly from said plateform, said container assembly extending over a part of the area of said platform comprising:

an elongate container front wall having upper and lower longitudinal edges spaced from said truck wall;

a container top extending from said truck wall to said upper longitudinal edge of said container top wall;

a container end wall extending from said truck wall to form a corner of said container with a vertical edge of said front wall, wherein vertical edges of said front wall and end wall jointly defining said corner have interengageable formations extending the height of said walls to provide connection therebetween;

means for securing said container top and said front wall lower lognitudinal edge to said truck wall and said platform, respectively, so that said truck wall and said platform form a back wall and a bottom, respectively, of said container;

means for sealing said front wall lower longitudinal edge and said container cover in a watertight manner to said plateform and said truck wall, respectively;

said container top comprising an elongate hinged lid overlying said front wall upper longitudinal edge and hinge means connected to said elongate hinged lid for allowing pivotation thereof between open and closed positions;

said container top, said front wall and said end wall, prior to assembly, being nested in one another for transportation and storage in substantially flat condition; and retaining means secured to said truck wall and to said front wall upper longitudinal edge for retaining the latter in position, said retaining means being spaced from opposite ends of said container.

2. A combination as claimed in claim 1, further comprising a rain drip strip overlying said hinge means, means for securing said rain drip strip to said truck wall and means for sealing said drip strip to said truck wall.

3. A combination as claimed in claim 1, wherein said truck wall is a side wall of said truck and said end wall extends between said side wall and a vertical end edge portion of said front wall, and said interengageable formations connecting a vertical marginal edge portion of said end wall to said vertical end edge portion of said front wall being provided with a water-tight sealing member.

4. A combination as claimed in claim 1, wherein said lid is formed with a projection extending laterally outwardly beyond said front wall and forming a fingergrip to facilitate raising of the lid.

5. a combination as claimed in claim 4, wherein said projection includes a reinforcement flange extending downwardly along one longitudinal edge of said lid.

6. A combination as claimed in claim 5, wherein said flange is one of a pair of parallel, laterally spaced flanges depending from said lid at a marginal longitudinal edge portion of said lid, said edge portion projecting laterally outwardly of said front wall with the other one of said flanges adjacent an upper marginal edge portion of said front wall.

7. A combination as claimed in claim 1, wherein said lid is divided transversely thereof into two separate lid portions having marginal edge portions one of which overlaps the other.

8. A combination as claimed in claim 1, further comprising an elongate rain drip strip overlying said hinge means and means for sealingly securing said rain drip strip to said truck wall.

9. A container as claimed in claim 1, further comprising an elongate rain drip strip overlying said pivotal securing means when the container is assembled and means for sealingly securing said rain drip strip to said truck platform wall.

10. A combination as claimed in claim 1, wherein said front wall is vertically divided into separate portions and said separate portions have interengageable formations extending the height of said front wall.

11. A combinations as claimed in claim 1, further comprising retaining means secured to said truck wall and to said front wall upper longitudinal edge for retaining the latter in position, said retaining means being spaced from opposite ends of said container.

12. A combination as claimed in claim 3, wherein a depending marginal edge portion of said container lid extends along the outer surface of said front wall.

13. A combination as claimed in claim 3, wherein said platform comprises a channel-shaped floor, and wherein resilient sealing means shaped to conform to the shape of said platform floor are provided for sealing said end wall to said platform floor.

14. A container assembly for installation within a pick-up truck, said truck including a platform and a truck wall extending upwardly from said plateform, said container assembly extending over a part of the area of said platform, comprising:

an elongate container front wall having upper and lower longitudinal edges spaced from said truck wall;

a container top extending from said truck wall to said upper longitudinal edge of said container top wall;

means for fixedly securing said front wall lower longitdinal edge to said platform, so that said platform forms the bottom of said container;

hinge means for pivotably connecting said container top to said truck wall so that said truck wall forms a rear wall of said container; and means for sealing said front wall lower longitudinal edge and said container cover in a watertight manner to said platform and said truck wall, respectively;

said container top comprising an elongate hinged lid overlying said front wall upper longitudinal edge, and said container top, said front wall and said end wall, prior to assembly, being nested in one another for transportation and storage in substantially flat condition.

15. A container assembly as set forth in claim 14, wherein said lid has a pair of parallel, spaced apart inner and outer flanges depending from said lid at a marginal edge portion of said lid, side edge portion projecting beyond said front wall, the outer one of said flanges forming a finger grip to facilitate raising of the lid and the other of said flanges extending adjacent an upper marginal edge portion of said front wall.

16. A container assembly as set forth in claim 14, further comprising a container end wall extending from said truck wall to form a corner of said container with a vertical edge of said front wall, wherein vertical edges of said front wall and end wall jointly defining said corner have interengageable formations extending the height of said walls to provide connection therebetween, and retaining means secured to said truck wall and to said front wall upper longitudinal edge for retaining the latter in position, said retaining means being spaced from opposite ends of said container.

17. A container assembly as set forth in claim 15, further comprising a container end wall extending from said truck wall to form a corner of said container with a vertical edge of said front wall, wherein vertical edges of said front wall and end wall jointly defining said corner have interengageable formations extending the height of said walls to provide connection therebetween, said container top, front wall and end wall, prior to assembly, being nested in one another for transportation and storage in substantially flat condition, and retaining means secured to said truck wall and to said front wall upper longitudinal edge for retaining the latter in position, said retaining means being spaced from opposite ends of said container.

* * * * *